United States Patent
Okasaka

(10) Patent No.: US 11,838,466 B1
(45) Date of Patent: Dec. 5, 2023

(54) IMAGE READING APPARATUS

(71) Applicant: TOSHIBA TEC KABUSHIKI KAISHA, Tokyo (JP)

(72) Inventor: Keigo Okasaka, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/098,138

(22) Filed: Jan. 18, 2023

(30) Foreign Application Priority Data

Jun. 3, 2022 (JP) ................................. 2022-090821

(51) Int. Cl.
*H04N 1/00* (2006.01)
*H04N 1/12* (2006.01)

(52) U.S. Cl.
CPC ..... *H04N 1/00615* (2013.01); *H04N 1/00602* (2013.01)

(58) Field of Classification Search
CPC ........... H04N 1/00615; H04N 1/00602; H04N 1/00018; H04N 1/00082; H04N 1/00013
See application file for complete search history.

(56) References Cited

U.S. PATENT DOCUMENTS

| | | | | |
|---|---|---|---|---|
| 6,029,970 A | * | 2/2000 | Hwang | B41J 11/48 271/9.13 |
| 2003/0202218 A1 | * | 10/2003 | Morinaga | H04N 1/00631 358/474 |
| 2009/0251743 A1 | * | 10/2009 | Taniguchi | H04N 1/0058 358/498 |
| 2010/0225983 A1 | * | 9/2010 | Fujii | H04N 1/1235 358/498 |
| 2019/0098174 A1 | * | 3/2019 | Kanaya | H04N 1/19 |

FOREIGN PATENT DOCUMENTS

| | | |
|---|---|---|
| JP | 6-133121 | 5/1994 |
| JP | 2002-152463 | 5/2002 |
| JP | 2004-137001 | 5/2004 |

* cited by examiner

*Primary Examiner* — Iriana Cruz
(74) *Attorney, Agent, or Firm* — AMIN, TUROCY & WATSON, LLP

(57) ABSTRACT

An image reading apparatus includes a frame, a conveying roller, a reading section, a first guide member, a second guide member, a supporting section, and a locking section. The conveying roller conveys a sheet along a conveying path. The reading section is supported rotatably around a first turning axis. The reading section reads an image on the sheet in a reading position in the conveying path. The first guide member is provided in the reading section. The second guide member is provided in a position opposed to the first guide member across the conveying path. A first end portion of the supporting section is supported to be rotatable around a second turning axis. The locking section is locked to a portion between the first end portion and a second end portion in the supporting section. The locking section rotates in a first direction around the first turning axis.

20 Claims, 6 Drawing Sheets

IMAGE READING APPARATUS

CROSS-REFERENCE TO RELATED APPLICATION

This application is based upon and claims the benefit of priority from Japanese Patent Application No. 2022-090821 filed on Jun. 3, 2022, the entire contents of which are incorporated herein by reference.

FIELD

Embodiments described herein relate generally to an image reading apparatus, an image forming apparatus, and an image reading method.

BACKGROUND

There has been used an image reading apparatus that reads an image on a sheet while conveying the sheet.

In general, a relatively thin sheet (plain paper) has relatively small bending rigidity (relatively weak stiffness) and a relatively thick sheet (thick paper) has relatively large bending rigidity (relatively strong stiffness).

If reading the image on the sheet, the image reading apparatus sometimes bends the sheet along a conveying path for conveying the sheet. In this case, bending stress (bending moment) acting on the sheet changes according to the thickness of the sheet.

DETAILED DESCRIPTION

Figure 1:
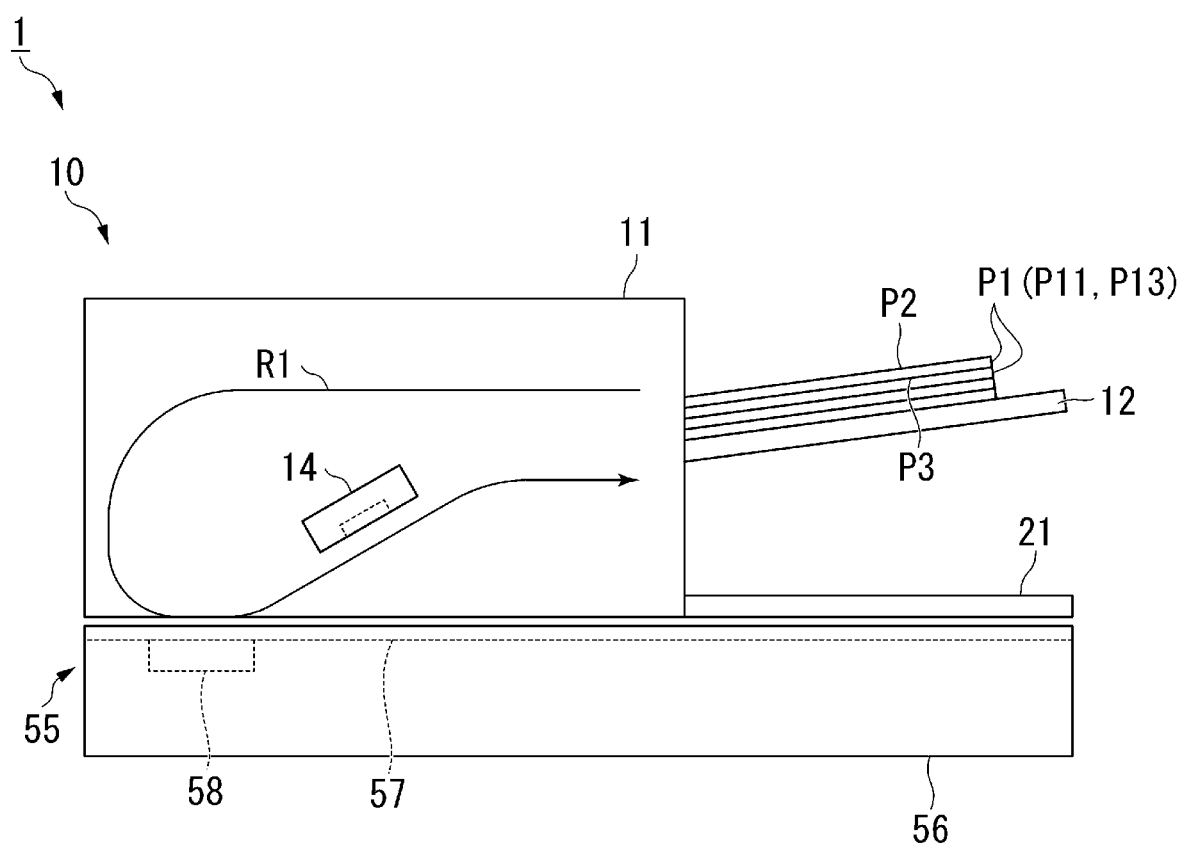
FIG. 1 is a side view illustrating an overview of an image reading apparatus in an embodiment.

An aspect of embodiments is to provide an image reading apparatus capable of adjusting bending stress acting on a sheet if reading an image on the sheet.

(1) An image reading apparatus according to a first aspect of an embodiment includes a frame, a conveying roller, a reading section, a first guide member, a second guide member, a supporting section, and a locking section. The conveying roller conveys a sheet along a conveying path. The reading section is supported rotatably around, with respect to the frame, a first turning axis extending along a horizontal plane and disposed above the conveying path. The reading section reads an image on the sheet in a reading position further on a downstream side in a conveying direction in which the sheet is conveyed than a position corresponding to the conveying roller in the conveying path. The first guide member is provided in the reading section to extend across the reading position in the conveying direction on the conveying path side with respect to the reading section and comes into contact with the sheet from above the sheet. The second guide member is provided to extend across the reading position in the conveying direction in a position opposed to the first guide member across the conveying path and comes into contact with the sheet from below the sheet. The second guide member holds, in conjunction with the first guide member, the sheet to be convex centering on the reading position in the conveying direction from the second guide member toward the first guide member. A first end portion of the supporting section is supported to be rotatable around, with respect to the frame, a second turning axis extending the horizontal plane and a second end portion of the supporting section comes into contact with, from above, the sheet present further on the downstream side than the reading position. The locking section is provided in at least one of the reading section and the first guide member and is locked, from below, to a portion between the first end portion and the second end portion in the supporting section. The locking section rotates in a first direction from the first guide member toward the second guide member around the first turning axis with gravity acting on the reading section, the first guide member, and the locking section.

(2) A second aspect of the embodiment may be the image reading apparatus described in above (1) further including an urging member configured to urge the second end portion of the supporting section from the first guide member toward the second guide member.

(3) A third aspect of the embodiment may be the image reading apparatus described in above (1) or (2), wherein the second end portion of the supporting section is disposed further on an upstream side in the conveying direction than the first end portion of the supporting section.

(4) A fourth aspect of the embodiment may be the image reading apparatus described in any one of above (1) to (3) further including a pressing roller rotatably supported at the second end portion of the supporting section and configured to come into contact with, from above, the sheet present further on the downstream side than the reading position.

(5) A fifth aspect of the embodiment may be the image reading apparatus described in above (4), wherein, if a line connecting a distal end projecting toward the conveying path in the locking section and a distal end projecting toward the conveying path in the second guide member further on the downstream side than the reading position is defined as a reference line, the pressing roller projects further in the first direction around the first turning axis than the reference line.

(6) Another aspect is an image reading method involving conveying a sheet along a conveying path using a conveying roller; reading an image on the sheet in a reading position further on a downstream side in a conveying direction in which the sheet is conveyed than a position corresponding to the conveying roller in the conveying path using a reading section supported rotatably around, with respect to a frame, a first turning axis extending along a horizontal plane and disposed above the conveying path; bringing a first guide member into contact with the sheet from above the sheet, the first guide member provided in the reading section to extend across the reading position in the conveying direction on the conveying path side with respect to the reading section; bringing a second guide member into contact with the sheet from below the sheet and hold, in conjunction with the first guide member, the second guide member provided to extend across the reading position in the conveying direction in a position opposed to the first guide member across the conveying path, the sheet to be convex centering on the reading position in the conveying direction from the second guide member toward the first guide member; bringing a second end portion of a supporting section into contact with, from above, the sheet present further on the downstream side than the reading position, a first end portion of supporting section is supported to be rotatable around, with respect to the frame, a second turning axis extending along the horizontal plane; and rotating a locking section provided in at least one of the reading section and the first guide member and locked, from below, to a portion between the first end portion and the second end portion in the supporting section, in a first direction from the first guide member toward the second guide member around the first turning axis with gravity acting on the reading section, the first guide member, and the locking section.

An image reading apparatus in an embodiment is explained below with reference to the drawings.

As illustrated in FIG. 1, an image reading apparatus 1 in this embodiment includes a conveying and reading unit 10 and a reading unit 55.

Figure 2:
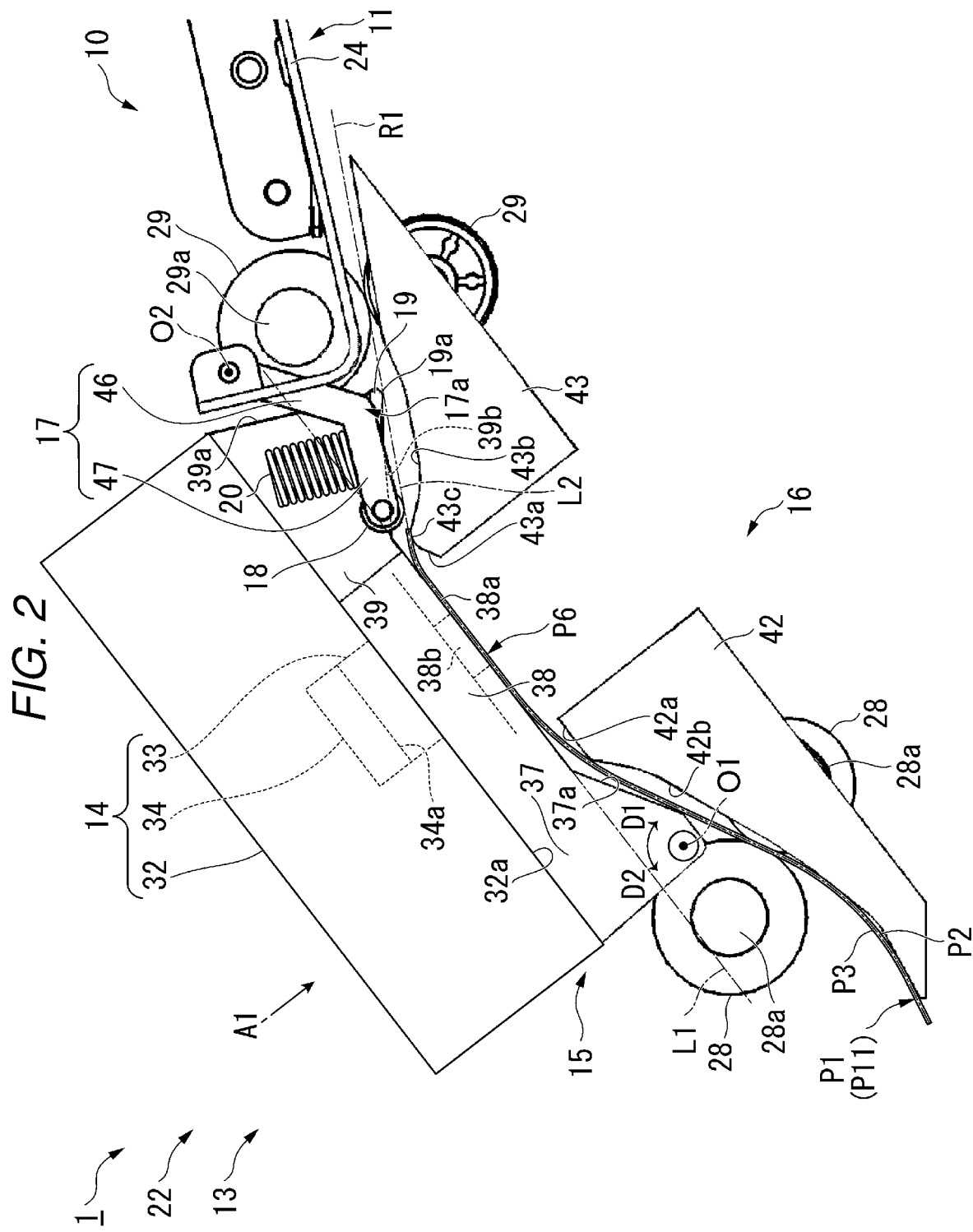
FIG. 2 is a side view of a main part of a conveying and reading unit of the image reading apparatus.

As illustrated in FIGS. 1 and 2, the conveying and reading unit 10 includes an upper frame (a frame) 11, a paper feeding tray 12, a conveying section 13, a rear-surface reading section (a reading section) 14, a first guide member 15, a second guide member 16, a supporting section 17, a pressing roller 18, a locking section 19, a spring (an urging member) 20, and a paper discharge tray 21. FIG. 2 is a side view when the conveying and reading unit 10 is viewed along a first turning axis O1 and a second turning axis O2 explained below. In the following explanation, the rear-surface reading section 14, the first guide member 15, and the locking section 19 are referred to as turning unit 22.

The upper frame 11 defines an external shape of a main body that is a portion other than the paper feeding tray 12 and the paper discharge tray 21 in the conveying and reading unit 10. The upper frame 11 has a rectangular parallelepiped box shape. A not-illustrated opening is formed in a portion where the paper feeding tray 12 and the paper discharge tray 21 are fixed in the upper frame 11.

Figure 3:
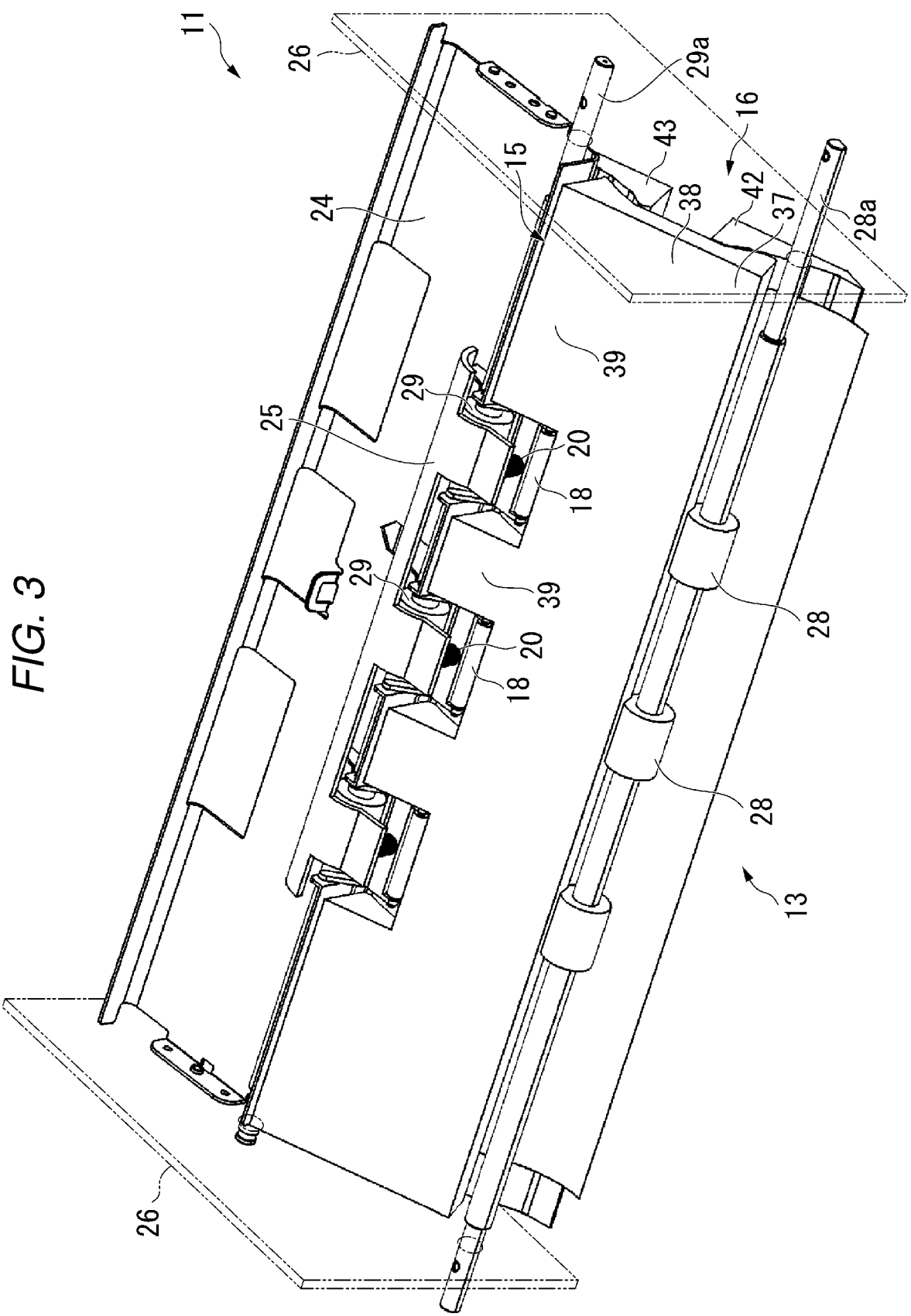
FIG. 3 is a perspective view of the main part of the conveying and reading unit of the image reading apparatus.

As illustrated in FIGS. 2 and 3, for example, the upper frame 11 includes a first frame 24, a second frame 25, and a pair of third frames 26. In FIG. 3, the pair of third frames 26 is indicated by alternate long and two short dashes lines.

The first frame 24 and the second frame 25 are formed by, for example, bending a steel plate. The pair of third frames 26 is disposed to sandwich a conveying path R1 explained below.

As illustrated in FIG. 1, the paper feeding tray 12 is fixed in an intermediate part in the up-down direction on a side surface of the upper frame 11.

As illustrated in FIGS. 2 and 3, the conveying section 13 includes a pair of first conveying rollers (conveying rollers) 28 and a pair of second conveying rollers 29.

The paper feeding tray 12, the pair of first conveying rollers 28, the pair of second conveying rollers 29, and the paper discharge tray 21 form the conveying path R1 on which a sheet P1 is conveyed (see FIG. 1 as well).

As illustrated in FIG. 2, the pair of first conveying rollers 28 respectively has cylindrical shapes and is disposed to be opposed to each other. In this specification, "opposed" includes a meaning of "in contact" as well. For example, the pair of first conveying rollers 28 is supported rotatably around a rotating shaft 28a (see FIG. 3 as well) provided in the pair of third frames 26 of the upper frame 11.

The pair of second conveying rollers 29 respectively has cylindrical shapes and is disposed to be opposed to each other. For example, the pair of second conveying rollers 29 is supported rotatably around a rotating shaft 29a (see FIG. 3 as well) provided in the pair of third frames 26 of the upper frame 11. The rotating shaft 29a and the rotating shaft 28a are parallel to each other and are respectively extend along the horizontal plane.

The pair of first conveying rollers 28 and the pair of second conveying rollers 29 convey the sheet P1 along the conveying path R1. The pair of second conveying rollers 29 is disposed further on a downstream side in a conveying direction in which the sheet P1 is conveyed (hereinafter simply referred to as downstream side as well) than the pair of first conveying rollers 28.

As illustrated in FIG. 2, the rear-surface reading section 14 is disposed above the conveying path R1. For example, the rear-surface reading section 14 includes a housing 32, a lens unit 33, and an image sensor 34. For example, the housing 32 has a rectangular parallelepiped box shape. For example, in a natural state in which an external force does not act on the turning unit 22, a lower surface 32a of the housing 32 is inclined to gradually extend upward toward the downstream side.

The housing 32 is supported rotatably around, with respect to the first frame 24 of the upper frame 11, the first turning axis O1 extending along the horizontal plane. It is preferable that a rotation restricting section that restricts a range in which the housing 32 rotates in a first direction D1 from the first guide member 15 toward the second guide member 16 around the first turning axis O1 is provided in the upper frame 11. In this case, in the turning unit 22 in the natural state, the housing 32 is locked to the rotation restricting section from above the rotation restricting section.

In the following explanation, the opposite direction of the first direction D1 around the first turning axis O1 is referred to as a second direction D2.

The lens unit 33 and the image sensor 34 are incorporated in the housing 32. The lens unit 33 includes a not-illustrated plurality of lenses. The lens unit 33 is fixed to the lower surface 32a of the housing 32. The lens unit 33 forms, on a light receiving surface 34a of the image sensor 34, an image on a second surface (a rear surface) P3 of the sheet P1.

The image sensor 34 acquires image data of the image formed on the light receiving surface 34a.

As explained above, the rear-surface reading section 14 reads the image on the second surface P3 of the sheet P1 in a reading position P6 further on the downstream side than a position corresponding to the pair of first conveying rollers 28 in the conveying path R1. The reading position P6 means a position where the rear-surface reading section 14 reads the image on the second surface P3 of the sheet P1 in the conveying path R1.

The first guide member 15 is a so-called rear surface guide. As illustrated in FIG. 2, the first guide member 15 is fixed to the lower surface 32a of the housing 32 of the rear-surface reading section 14. The first guide member 15 is provided to extend across the reading position P6 in the conveying direction on the conveying path R1 side with respect to the rear-surface reading section 14 (between the rear-surface reading section 14 and the conveying path R1). The first guide member 15 is disposed above the conveying path R1. The first guide member 15 comes into contact with the sheet P1 from above the sheet P1.

As illustrated in FIGS. 2 and 3, the first guide member 15 includes a first inclined section 37, a flat section 38, and a plurality of second inclined sections 39.

As illustrated in FIG. 2, the first inclined section 37 is fixed to a portion on an upstream side on the opposite side of the downstream side in the conveying direction in the lower surface 32a of the housing 32. A lower surface 37a of the first inclined section 37 is inclined to gradually approach the lower surface 32a of the housing 32 toward the downstream side.

The flat section 38 is fixed to an intermediate part in the conveying direction in the lower surface 32a of the housing 32. A lower surface 38a of the flat section 38 extends along the lower surface 32a of the housing 32. In the flat section 38, a contact glass 38b is incorporated on the lower surface 38a side. The contact glass 38b is disposed for the image sensor 34 to form, on the light receiving surface 34a, the image on the second surface P3 of the sheet P1. The contact glass 38b is a member that transmits the image on the second surface P3 and guides the image.

A straight line passing the lower surface 38a is defined as a first reference line L1. The end portion on the upstream side in the lower surface 38a stretches out to the end portion on the downstream side in the lower surface 37a of the first inclined section 37.

Figure 4:
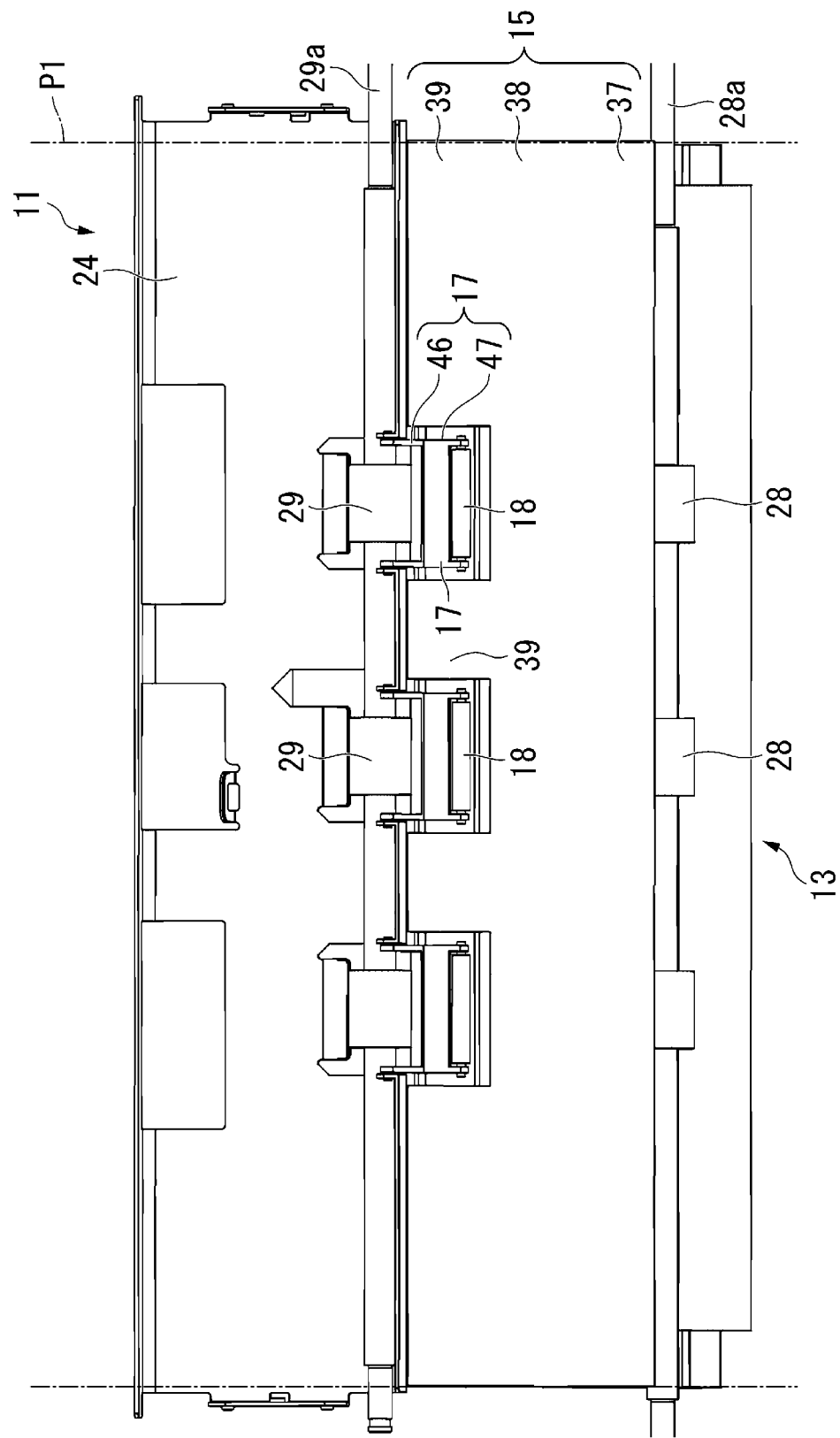
FIG. 4 is an A1 direction arrow view in FIG. 2.

As illustrated in FIG. 4, the first inclined section 37 and the flat section 38 respectively extend over the entire length in the width direction of the sheet P1. In FIG. 4, the rear-surface reading section 14 and the second frame 25 are not illustrated.

For example, the sheet P1 is a sheet of the A4 size of the Japan Industrial Standard.

As illustrated in FIG. 2, the second inclined section 39 is fixed to a portion on the downstream side in the lower surface 32a of the housing 32. A lower surface 39a at the end portion on the downstream side of the second inclined section 39 is inclined to gradually approach the lower surface 32a of the housing 32 toward the downstream side. A lower surface 39b other than the lower surface 39a in the second inclined section 39 is inclined to gradually separate from the lower surface 32a of the housing 32 toward the downstream side. The end portion on the downstream side in the lower surface 39b stretches out to the end portion on the upstream side in the lower surface 39a.

As illustrated in FIG. 3, the plurality of second inclined sections 39 are disposed at intervals from one another in the width direction.

As illustrated in FIG. 2, the lower surfaces 37a, 38a and 39b of the first guide member 15 are disposed to be convex centering on the reading position P6 in the conveying direction from the second guide member 16 toward the first guide member 15.

The first inclined section 37, the flat section 38 (excluding the contact glass 38b), and the plurality of second inclined sections 39 configuring the first guide member 15 are formed by synthetic resin, metal, or the like.

The second guide member 16 is provided to extend across the reading position P6 in the conveying direction in a position opposed to the first guide member 15 across the conveying path R1. The second guide member 16 includes a first inclined piece 42 and a second inclined piece 43. The first inclined piece 42 and the second inclined piece 43 are disposed to sandwich the reading position P6 in the conveying direction. Specifically, the first inclined piece 42 is disposed further on the upstream side than the reading position P6. The second inclined piece 43 is disposed further on the downstream side than the reading position P6.

The first inclined piece 42 is a so-called upstream guide. The first inclined piece 42 is opposed to the first inclined section 37 of the first guide member 15 and extends further to the upstream side than the first inclined section 37.

An upper surface 42a at the end portion on the downstream side of the first inclined piece 42 is substantially parallel to the lower surface 38a of the flat section 38. An upper surface 42b other than the upper surface 42a in the first inclined piece 42 is inclined to gradually approach the first reference line L1 toward the downstream side. The end portion on the downstream side in the upper surface 42b stretches out to the end portion on the upstream side in the upper surface 42a.

A connecting section of the upper surface 42a and the upper surface 42b is opposed to a connecting section of the lower surface 37a and the lower surface 38a.

The second inclined piece 43 is a so-called downstream guide. The second inclined piece 43 is opposed to the second inclined section 39 of the first guide member 15 and extends further to the downstream side than the second inclined section 39.

An upper surface 43a at the end portion on the upstream side of the second inclined piece 43 is inclined to gradually approach the first reference line L1 toward the downstream side. An upper surface 43b other than the upper surface 43a in the second inclined piece 43 is inclined to gradually separate from the first reference line L1 toward the downstream side.

A connecting section 43c of the upper surface 43a and the upper surface 43b is a distal end projecting toward the conveying path R1 (the sheet P1) in the second guide member 16 further on the downstream side than the reading position P6.

The first inclined piece 42 and the second inclined piece 43 are formed by synthetic resin, metal, or the like.

As explained above, the first inclined piece 42 and the second inclined piece 43 of the second guide member 16 come into contact with the sheet P1 from below the sheet P1. The second guide member 16 holds, in conjunction with the first guide member 15, the sheet P1 to be convex centering on the reading position P6 in the conveying direction from the second guide member 16 toward the first guide member 15.

For example, the supporting section 17 includes a first piece 46 and a second piece 47. The first piece 46 and the second piece 47 respectively extend in predetermined directions.

For example, a first end portion of the first piece 46 (a first end portion of the supporting section 17) is supported by the first frame 24 of the upper frame 11 to be rotatable around the second turning axis O2. The second turning axis O2 is an axis extending along the horizontal plane and parallel to each of the first turning axis O1 and the rotating shaft 29a. The second turning axis O2 is disposed further on the downstream side than the reading position P6.

The first end portion of the first piece 46 may be directly supported by the upper frame 11 to be rotatable with respect to the upper frame 11. The first end portion of the first piece 46 may share a rotation axis with the rotating shaft 29a.

The first end portion of the second piece 47 stretches out to a second end portion on the opposite side of the first end portion in the first piece 46. In the following explanation, a portion where the first piece 46 and the second piece 47 are connected is referred to as a connecting portion 17a. A second end portion on the opposite side of the first end portion in the second piece 47 (a second end portion of the supporting section 17) is disposed further on the upstream side than the first end portion of the first piece 46. The second end portion of the second piece 47 may be disposed further on the downstream side than the first end portion of the first piece 46.

The first piece 46 and the second piece 47 have a V shape convex obliquely downward in a side view illustrated in FIG. 2.

The pressing roller 18 has a columnar shape and is disposed along the horizontal plane. The pressing roller 18 is rotatably supported at the second end of the second piece 47. The pressing roller 18 is disposed further on the downstream side than the connecting section 43c of the second inclined piece 43.

The pressing roller 18 comes into contact with, from above the sheet P1, the sheet P1 present further on the downstream side than the reading position P6. The second end portion of the second piece 47 comes into contact with, via the pressing roller 18, from above the sheet P1, the sheet P1 present further on the downstream side than the reading position P6.

The supporting section 17 and the pressing roller 18 are disposed further on the downstream side than the reading position P6.

Figure 5:
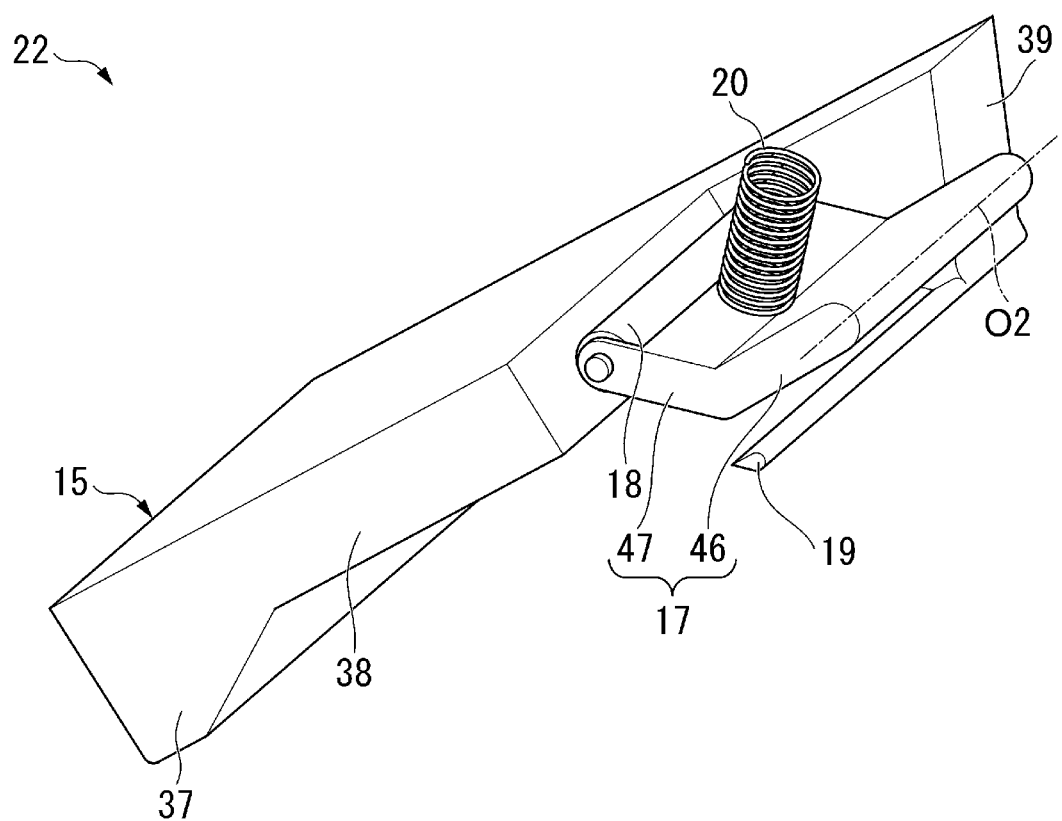
FIG. 5 is a broken perspective view of a first guide member and the like of the image reading apparatus.

As illustrated in FIGS. 2 and 5, the locking section 19 has a bar shape and extends along the first turning axis O1. As illustrated in FIG. 5, the locking section 19 is provided at the lower end portion of the second inclined section 39 in the first guide member 15. As illustrated in FIG. 2, the locking section 19 is locked to the connecting portion 17a of the supporting section 17 from below the connecting portion 17a.

A portion to which the locking section 19 is locked in the supporting section 17 is not limited if the portion is a portion between the first end portion of the first piece 46 and the second end portion of the second piece 47.

If the housing 32 is not locked to the rotation restricting section, the turning unit 22 rotates in the first direction D1 around the first turning axis O1 with gravity acting on the turning unit 22.

The locking section 19 may be provided in the rear-surface reading section 14 or may be provided in each of the rear-surface reading section 14 and the first guide member 15.

In the side view illustrated in FIG. 2, a line connecting a distal end 19a projecting toward the conveying path R1 (the sheet P1) in the locking section 19 and the connecting section 43c of the second inclined piece 43 is defined as a second reference line (a reference line) L2. The pressing roller 18 preferably projects further in the first direction D1 (from the first guide member 15 toward the second guide member 16) around the first turning axis O1 than the second reference line L2.

For example, the spring 20 is a helical spring and is used as a compression spring. As illustrated in FIG. 3, the spring 20 is disposed between the second inclined sections 39 adjacent to each other in the width direction in the first guide member 15. A first end portion of the spring 20 is fixed to the lower surface of the second frame 25 of the upper frame 11. The first end portion of the spring 20 may be fixed to the first guide member 15.

As illustrated in FIG. 5, a second end portion opposite to the first end portion in the spring 20 is in contact with the second piece 47 of the supporting section 17 from above the second piece 47.

The spring 20 urges the second end portion of the second piece 47 from the first guide member 15 toward the second guide member 16.

As illustrated in FIG. 1, the paper discharge tray 21 is fixed to the lower end portion on a side surface of the upper frame 11. The paper discharge tray 21 is disposed below the paper feeding tray 12.

A configuration of the reading unit 55 is not limited. The reading unit 55 is disposed below the conveying and reading unit 10 and fixed to the upper frame 11 of the conveying and reading unit 10. For example, the reading unit 55 includes a lower frame 56, a contact glass 57, and a front-surface reading section 58.

The lower frame 56 defines an external shape of the reading unit 55. The lower frame 56 has a rectangular parallelepiped box shape opened upward.

The contact glass 57 has a flat shape and is fixed to the opening of the lower frame 56. The conveying path R1 passes on the contact glass 57.

The front-surface reading section 58 is configured the same as the rear-surface reading section 14. The front-surface reading section 58 reads an image on a first surface (a front surface) P2 opposite to the second surface P3 in the sheet P1. The front-surface reading section 58 is incorporated in the lower frame 56. The front-surface reading section 58 may be able to move along the contact glass 57 in the lower frame 56.

Subsequently, an operation of the image reading apparatus 1 configured as explained above is explained. First, a case in which the sheet P1 is relatively thin plain paper P11 is explained. For example, the plain paper P11 is paper having thickness less than 0.21 mm.

A user places a plurality of pieces of plain paper P11 on the paper feeding tray 12 of the image reading apparatus 1. The plurality of pieces of plain paper P11 are stacked in the up-down direction that is the thickness direction of the plain paper P11.

If the user starts the image reading apparatus 1, the conveying and reading unit 10 conveys, with the conveying section 13, the plurality of pieces of plain paper P11 toward the downstream side in order from the plain paper P11 placed at the top among the plurality of pieces of plain paper P11.

If the plain paper P11 conveyed along the conveying path R1 passes on the reading unit 55, the front-surface reading section 58 reads an image on the first surface P2 of the plain paper P11. The plain paper P11 conveyed toward the downstream side by the pair of first conveying rollers 28 passes between the first guide member 15 and the second guide member 16 along the conveying path R1. The first guide member 15 and the second guide member 16 hold the plain paper P11 to be convex centering on the reading position P6 in the conveying direction from the second guide member 16 toward the first guide member 15.

Since bending rigidity of the plain paper P11 is relatively small, further on the upstream side than the reading position P6, the plain paper P11 cannot rotate the turning unit 22 in the second direction D2 around the first turning axis O1 while resisting force of the turning unit 22 rotating in the first direction D1 around the first turning axis O1. A curvature radius of the plain paper P11 to be bent becomes relatively small. Predetermined bending stress acts on the plain paper P11. Further on the downstream side than the reading position P6, the plain paper P11 is sandwiched by the pressing roller 18 and the second guide member 16 and conveyed to the downstream side in a stable state.

If the plain paper P11 passes the reading position P6, the rear-surface reading section 14 reads the image on the second surface P3 of the plain paper P11 through the contact glass 38b of the flat section 38.

The plain paper P11, the image on the second surface P3 of which was read, is conveyed toward the downstream side by the pair of second conveying rollers 29. The plain paper P11, the images on the first surface P2 and the second surface P3 of which were read, is discharged onto the paper discharge tray 21. The images read by the front-surface reading section 58 and the rear-surface reading section 14 are converted as appropriate and stored in the image reading apparatus 1.

Figure 6:
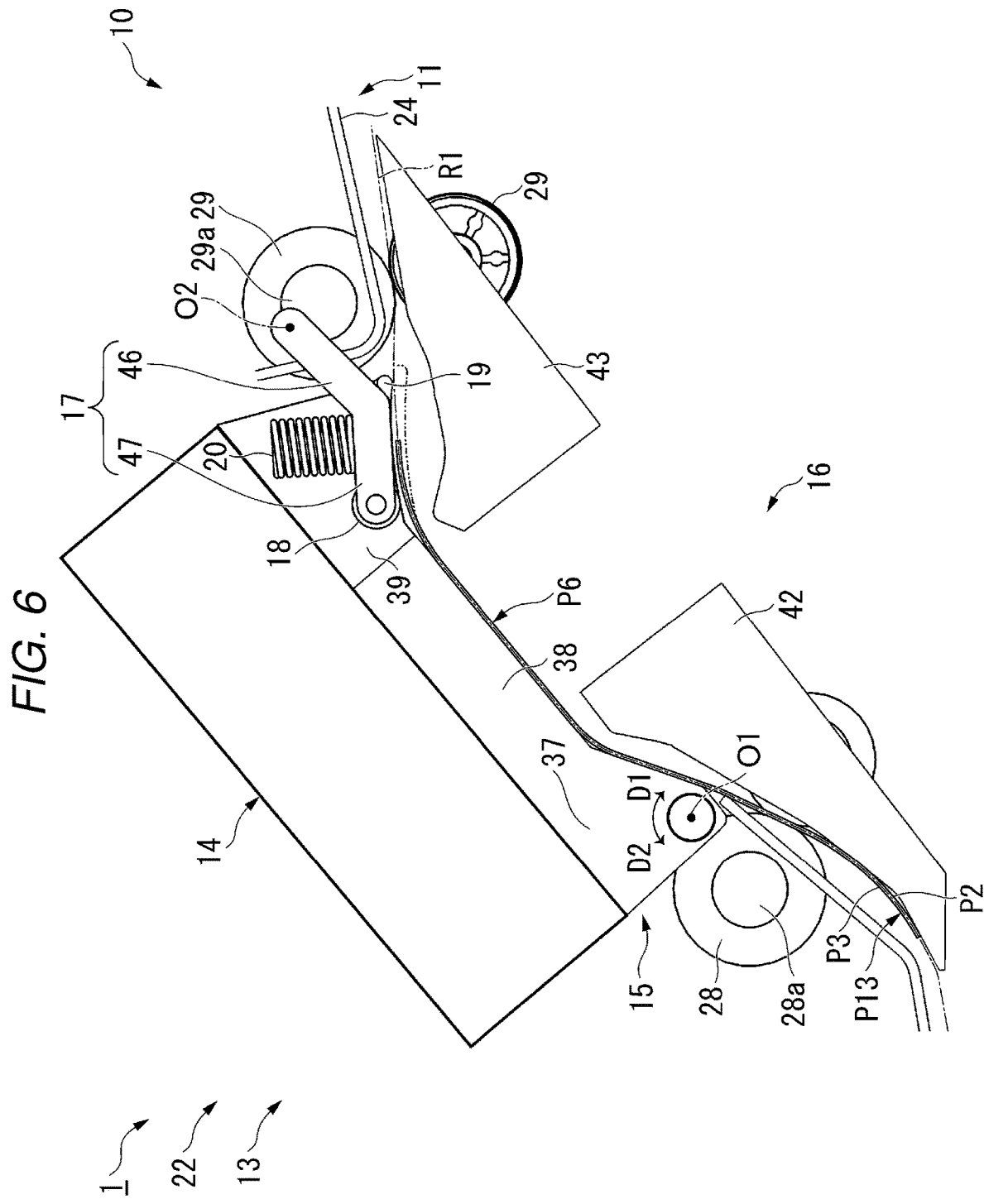
FIG. 6 is a side view of the main part when the image reading apparatus conveys thick paper.

On the other hand, as illustrated in FIG. 6, if the sheet P1 is thick paper P13, bending rigidity of the thick paper P13 is relatively large. For example, the thick paper P13 is paper having thickness of 0.21 mm or more.

Therefore, the turning unit 22 rotates in the second direction D2 around the first turning axis O1 with a restoration force of the thick paper P13 while resisting force of the turning unit 22 rotating in the first direction D1 around the first turning axis O1. A curvature radius of the thick paper P13 to be bent becomes relatively large and bending stress acting on the thick paper P13 decreases. In FIG. 6, a shape of the first guide member 15 before rotating in the second direction D2 is indicated by an alternate long and two short dashes line.

The supporting section 17 locked from below by the locking section 19 rotates around the second turning axis O2, whereby the pressing roller 18 separates from the second inclined piece 43 of the second guide member 16. It is possible to suppress an increase in conveyance resistance of the thick paper P13 and occurrence of jitter (a phenomenon in which a read color deviates from an original color of an image) when the distal end of the thick paper P13 rushes into between the pressing roller 18 and the second guide member 16.

If the thick paper P13 passes between the first guide member 15 and the second guide member 16, the turning unit 22 rotates in the first direction D1 around the first turning axis O1 with gravity acting on the turning unit 22 and is locked to the rotation restricting section.

As explained above, if reading the image on the sheet P1, the image reading apparatus 1 in this embodiment can adjust the bending stress acting on the sheet P1.

The image reading apparatus 1 includes the spring 20. Since the spring 20 presses the sheet P1 via the supporting section 17, it is possible to return the pressing roller 18 to a predetermined position where the pressing roller 18 is in contact with the sheet P1. It is possible to cause bending stress to act on the sheet P1 being conveyed. It is possible to suppress loosening and flopping of the plain paper P11 in the reading position P6.

The second end portion of the supporting section 17 is disposed further on the upstream side than the first end portion of the supporting section 17. Therefore, the first end portion of the supporting section 17 less easily interferes with the reading position P6. Further, the pressing roller 18 and the second inclined piece 43 of the second guide member 16 alternately sandwich the plain paper P11 to further bend the plain paper P11. Consequently, the conveyance of the plain paper P11 is stabilized.

In order to stabilize the conveyance of the plain paper P11, a position where the plain paper P11 is sandwiched needs to be close to the reading position P6 to a certain degree. In that case, in order to form a space for providing the second turning axis O2 and the first end portion of the supporting section 17, interference with the rear-surface reading section 14 and the reading position P6 cannot be avoided. By adopting the configuration explained in this embodiment, it is possible to effectively use (increase) displacement of the locking section 19 necessary for the pressing roller 18 to separate from the second guide member 16 and escape to the outside of the conveying path R1.

The image reading apparatus 1 includes the pressing roller 18. Consequently, it is possible to reduce influence given to the sheet P1 if the supporting section 17 comes into contact with the sheet P1.

The pressing roller 18 is sometimes projected further in the first direction D1 around the first turning axis O1 than the second reference line L2. In this case, it is possible to generate stiffness in the sheet P1 and cause the sheet P1 to more surely come into contact with the rear-surface reading section 14.

The urging member is the spring 20 in the above explanation. However, the urging member is not limited to the spring 20 and may be synthetic rubber or the like.

The number of first conveying rollers 28 included in the conveying and reading unit 10 may be one. The conveying and reading unit 10 may not include the paper feeding tray 12, the pressing roller 18, the paper discharge tray 21, the spring 20, and the pair of second conveying rollers 29. If the conveying and reading unit 10 does not include the pressing roller 18, the second end portion of the supporting section 17 directly comes into contact with the sheet P1.

The image reading apparatus 1 may not include the reading unit 55.

According to at least one embodiment explained above, since the image reading apparatus 1 includes the supporting section 17, the locking section 19, and the turning axes O1 and O2, it is possible to adjust bending stress acting on the sheet P1.

Several embodiments of the present disclosure are explained above. However, these embodiments are presented as examples and are not intended to limit the scope of the invention. These embodiments can be implemented in other various forms. Various omissions, substitutions, and changes can be made without departing from the gist of the invention. The embodiments and the modifications thereof are included in the scope and the gist of the invention and included in the inventions described in the claims and the scope of equivalents of the inventions.

What is claimed is:

1. An image reading apparatus, comprising:
    a conveying roller configured to convey a sheet along a conveying path;
    a reading section supported rotatably around, with respect to a frame, a first turning axis extending along a horizontal plane and disposed above the conveying path and configured to read an image on the sheet in a reading position further on a downstream side in a conveying direction in which the sheet is conveyed than a position corresponding to the conveying roller in the conveying path;
    a first guide member provided in the reading section to extend across the reading position in the conveying direction on the conveying path side with respect to the reading section and configured to come into contact with the sheet from above the sheet;
    a second guide member provided to extend across the reading position in the conveying direction in a position opposed to the first guide member across the conveying path and configured to come into contact with the sheet from below the sheet and hold, in conjunction with the first guide member, the sheet to be convex centering on the reading position in the conveying direction from the second guide member toward the first guide member;
    a supporting section, a first end portion of which is supported to be rotatable around, with respect to the frame, a second turning axis extending along the horizontal plane and a second end portion of which comes into contact with, from above, the sheet present further on the downstream side than the reading position; and a locking section provided in at least one of the reading section and the first guide member and locked, from below, to a portion between the first end portion and the second end portion in the supporting section and configured to rotate in a first direction from the first guide member toward the second guide member around the first turning axis with gravity acting on the reading section, the first guide member, and the locking section.

2. The image reading apparatus according to claim 1, further comprising an urging member configured to urge the second end portion of the supporting section from the first guide member toward the second guide member.

3. The image reading apparatus according to claim 1, wherein the second end portion of the supporting section is disposed further on an upstream side in the conveying direction than the first end portion of the supporting section.

4. The image reading apparatus according to claim 1, further comprising a pressing roller rotatably supported at the second end portion of the supporting section and configured to come into contact with, from above, the sheet present further on the downstream side than the reading position.

5. The image reading apparatus according to claim 4, wherein, when a line connecting a distal end projecting toward the conveying path in the locking section and a distal end projecting toward the conveying path in the second guide member further on the downstream side than the reading position is defined as a reference line, the pressing roller projects further in the first direction around the first turning axis than the reference line.

6. The image reading apparatus according to claim 1, wherein the frame has a rectangular parallelepiped box shape.

7. The image reading apparatus according to claim 1, wherein the reading section comprises a scanner.

8. An image forming apparatus, comprising:
an image forming component; and
an image reading apparatus, comprising:
a conveying roller configured to convey a sheet along a conveying path;
a reading section supported rotatably around, with respect to a frame, a first turning axis extending along a horizontal plane and disposed above the conveying path and configured to read an image on the sheet in a reading position further on a downstream side in a conveying direction in which the sheet is conveyed than a position corresponding to the conveying roller in the conveying path;
a first guide member provided in the reading section to extend across the reading position in the conveying direction on the conveying path side with respect to the reading section and configured to come into contact with the sheet from above the sheet;
a second guide member provided to extend across the reading position in the conveying direction in a position opposed to the first guide member across the conveying path and configured to come into contact with the sheet from below the sheet and hold, in conjunction with the first guide member, the sheet to be convex centering on the reading position in the conveying direction from the second guide member toward the first guide member;
a supporting section, a first end portion of which is supported to be rotatable around, with respect to the frame, a second turning axis extending along the horizontal plane and a second end portion of which comes into contact with, from above, the sheet present further on the downstream side than the reading position; and a locking section provided in at least one of the reading section and the first guide member and locked, from below, to a portion between the first end portion and the second end portion in the supporting section and configured to rotate in a first direction from the first guide member toward the second guide member around the first turning axis with gravity acting on the reading section, the first guide member, and the locking section.

9. The image forming apparatus according to claim 8, further comprising an urging member configured to urge the second end portion of the supporting section from the first guide member toward the second guide member.

10. The image forming apparatus according to claim 8, wherein the second end portion of the supporting section is disposed further on an upstream side in the conveying direction than the first end portion of the supporting section.

11. The image forming apparatus according to claim 8, further comprising a pressing roller rotatably supported at the second end portion of the supporting section and configured to come into contact with, from above, the sheet present further on the downstream side than the reading position.

12. The image forming apparatus according to claim 11, wherein, when a line connecting a distal end projecting toward the conveying path in the locking section and a distal end projecting toward the conveying path in the second guide member further on the downstream side than the reading position is defined as a reference line, the pressing roller projects further in the first direction around the first turning axis than the reference line.

13. The image forming apparatus according to claim 8, wherein the frame has a rectangular parallelepiped box shape.

14. The image forming apparatus according to claim 8, wherein the reading section comprises a scanner.

15. An image reading method, comprising:
conveying a sheet along a conveying path using a conveying roller;
reading an image on the sheet in a reading position further on a downstream side in a conveying direction in which the sheet is conveyed than a position corresponding to the conveying roller in the conveying path using a reading section supported rotatably around, with respect to a frame, a first turning axis extending along a horizontal plane and disposed above the conveying path;
bringing a first guide member into contact with the sheet from above the sheet, the first guide member provided in the reading section to extend across the reading position in the conveying direction on the conveying path side with respect to the reading section;
bringing a second guide member into contact with the sheet from below the sheet and hold, in conjunction with the first guide member, the second guide member provided to extend across the reading position in the conveying direction in a position opposed to the first guide member across the conveying path, the sheet to be convex centering on the reading position in the conveying direction from the second guide member toward the first guide member;
bringing a second end portion of a supporting section into contact with, from above, the sheet present further on the downstream side than the reading position, a first end portion of supporting section is supported to be rotatable around, with respect to the frame, a second turning axis extending along the horizontal plane; and rotating a locking section provided in at least one of the reading section and the first guide member and locked, from below, to a portion between the first end portion and the second end portion in the supporting section, in a first direction from the first guide member toward the second guide member around the first turning axis with gravity acting on the reading section, the first guide member, and the locking section.

16. The image reading method according to claim 15, further comprising urging the second end portion of the supporting section from the first guide member toward the second guide member.

17. The image reading method according to claim 15, wherein the second end portion of the supporting section is disposed further on an upstream side in the conveying direction than the first end portion of the supporting section.

18. The image reading method according to claim 15, further comprising bringing a pressing roller, rotatably supported at the second end portion of the supporting section, into contact with, from above, the sheet present further on the downstream side than the reading position.

19. The image reading method according to claim 18, wherein, when a line connecting a distal end projecting toward the conveying path in the locking section and a distal end projecting toward the conveying path in the second guide member further on the downstream side than the reading position is defined as a reference line, the pressing roller projects further in the first direction around the first turning axis than the reference line.

20. The image reading method according to claim 15, wherein the reading section comprises a scanner.

* * * * *